(12) United States Patent
Kim et al.

(10) Patent No.: US 10,012,076 B2
(45) Date of Patent: Jul. 3, 2018

(54) MONITORING PROBE FOR DETECTING THE POSITION OF A FRESH WATER-SALT WATER INTERFACE IN AN OBSERVATION WELL

(71) Applicant: Korea Institute of Geoscience and Mineral Resources, DaeJeon (KR)

(72) Inventors: Yongcheol Kim, DaeJeon (KR); Heesung Yoon, Daejeon (KR); Kyung-Seok Ko, Daejeon (KR); Kyoochul Ha, Daejeon (KR); Dong-Chan Koh, Daejeon (KR)

(73) Assignee: KOREA INSTITUTE OF GROSCIENCE AND MINERAL RESOURCES, Daejeon (KR)

( * ) Notice: Subject to any disclaimer, the term of this patent is extended or adjusted under 35 U.S.C. 154(b) by 355 days.

(21) Appl. No.: 14/772,006

(22) PCT Filed: Apr. 16, 2015

(86) PCT No.: PCT/KR2015/003819
§ 371 (c)(1),
(2) Date: Sep. 1, 2015

(87) PCT Pub. No.: WO2015/194752
PCT Pub. Date: Dec. 23, 2015

(65) Prior Publication Data
US 2016/0348502 A1    Dec. 1, 2016

(30) Foreign Application Priority Data

Jun. 20, 2014  (KR) .......................... 10-2014-0075802

(51) Int. Cl.
*E21B 47/10*       (2012.01)
*E21B 49/08*       (2006.01)
(Continued)

(52) U.S. Cl.
CPC .............. *E21B 49/08* (2013.01); *G01C 13/00* (2013.01); *G01F 23/68* (2013.01); *G01F 23/76* (2013.01); *G08C 17/00* (2013.01); *B63B 22/20* (2013.01)

(58) Field of Classification Search
CPC ...... E21B 47/1015; E21B 47/00; E21B 49/08; G01C 13/00; G01C 13/006; G01F 23/68;
(Continued)

(56) References Cited

U.S. PATENT DOCUMENTS

| | | | |
|---|---|---|---|
| 7,048,089 B2 * | 5/2006 | West | G01V 1/16 181/105 |
| 2012/0041692 A1 * | 2/2012 | Suk | E03B 3/06 702/45 |

(Continued)

FOREIGN PATENT DOCUMENTS

| | | |
|---|---|---|
| KR | 275821 | 5/2002 |
| KR | 977155 | 8/2010 |

(Continued)

*Primary Examiner* — Manish S Shah
*Assistant Examiner* — Nigel Plumb
(74) *Attorney, Agent, or Firm* — Dentons US LLP

(57) ABSTRACT

Disclosed is a monitoring probe for observing groundwater, which is put into an observation well for observing the groundwater to indicate a position of a fresh water-salt water interface of the groundwater. According to the present invention, both ends of a probe body are separated from an inner circumference of an observation well by a catch preventing portion having a convex curved portion or a dumbbell-shaped portion, so that the probe body can be smoothly moved up and down without being caught by a ground-water inlet port of the observation well, thus providing an exact position of a fresh water-salt water interface.

16 Claims, 11 Drawing Sheets

(51) Int. Cl.
*G08C 17/00* (2006.01)
*G01F 23/68* (2006.01)
*G01F 23/76* (2006.01)
*G01C 13/00* (2006.01)
*B63B 22/20* (2006.01)

(58) Field of Classification Search
CPC ........... G01F 23/76; G01F 1/00; G08C 17/00; G01N 33/18; G01P 13/02; B63B 22/00
See application file for complete search history.

(56) References Cited

U.S. PATENT DOCUMENTS

| 2012/0227482 A1* | 9/2012 | Ha | E21B 19/008 |
| | | | 73/152.05 |
| 2013/0283903 A1* | 10/2013 | Kim | G01V 9/02 |
| | | | 73/170.29 |
| 2013/0289878 A1* | 10/2013 | Kim | G01F 23/0038 |
| | | | 702/2 |

FOREIGN PATENT DOCUMENTS

| WO | WO/2013/162115 A1 | 10/2013 |
| WO | WO/2013/162116 A1 | 10/2013 |

* cited by examiner

FIGURE 9
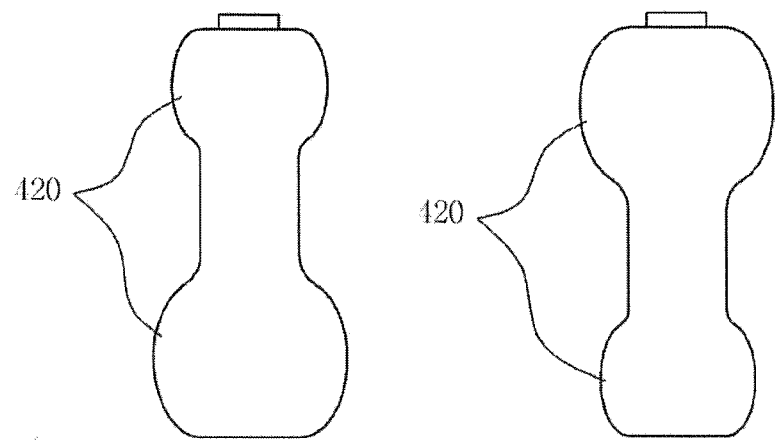
(g)          (h)
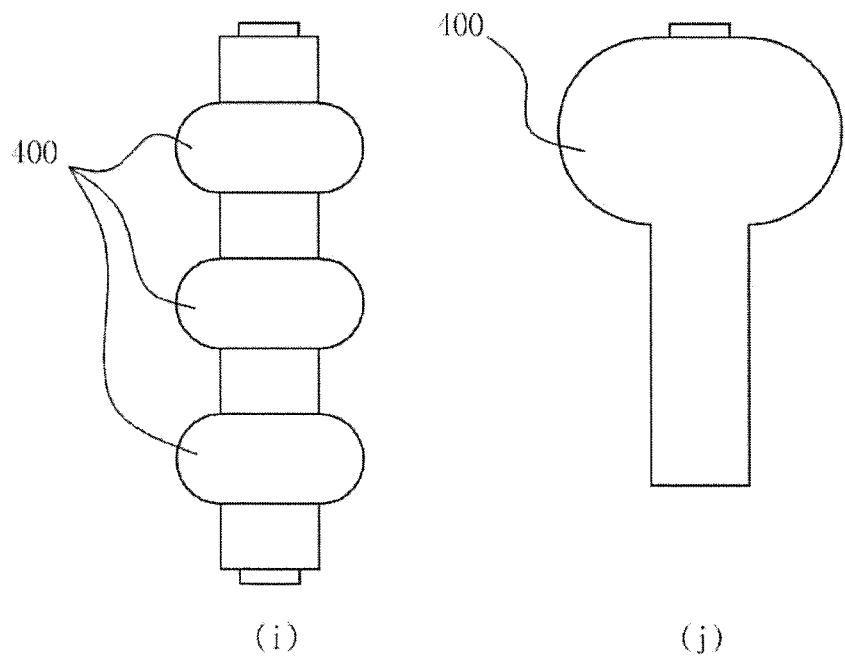
(i)          (j)

MONITORING PROBE FOR DETECTING THE POSITION OF A FRESH WATER-SALT WATER INTERFACE IN AN OBSERVATION WELL

CROSS REFERENCE TO RELATED APPLICATION

This application is the Section 371 National Stage of PCT/KR2015/003819 filed Apr. 16, 2015, the entirety of which is incorporated herein by reference to the extent permitted by law. This application claims the benefit of priority to Korean Patent Application No. KR 2014-0075802, filed Jun. 20, 2014 the entirety of which is incorporated herein by reference to the extent permitted by law.

FIELD OF THE INVENTION

The present invention generally relates to a monitoring probe for observing groundwater. More particularly, the present invention relates to a monitoring probe for observing groundwater, which is put into an observation well for observing the groundwater to indicate a position of a fresh water-salt water interface of the groundwater.

BACKGROUND OF THE INVENTION

Generally, the excessive use of groundwater in a coastal area lowers a water level of the groundwater, thus causing salt water (sea water) to flow into the groundwater and thereby contaminating the groundwater. Consequently, the groundwater cannot be used as drinking water, agricultural water, or industrial water.

Accordingly, a groundwater observation system is used in coastal areas, in which a groundwater observation well is bored and a wired or wireless measuring sensor is installed in the observation well to measure a groundwater level, temperature, electrical conductivity values, the position of a fresh water-salt water interface and the like, so as to monitor changes in groundwater.

Here, since the position of the fresh water-salt water interface (the interface between fresh water and salt water of the groundwater) is frequently changed by various complex phenomena such as the excessive pumping operation of the groundwater, rain, a tide phenomenon, and a sea level rise due to global warming, apparatuses capable of precisely tracking a changed position are being developed.

Meanwhile, the measuring sensor provided in the groundwater observation well of an actual coastal area is installed at a fixed depth regardless of whether it is a wired or wireless sensor, so it is difficult to check the position of the fresh water-salt water interface in real time. Further, when an apparatus for tracking a salt-water surface of the groundwater is inserted into or removed from the groundwater observation well, it is difficult to precisely install or remove a recovery apparatus at or from the groundwater salt-water-surface tracking apparatus according to a diameter of the observation well.

Further, when one desires to adjust buoyancy in order to precisely position the groundwater salt-water-surface tracking apparatus at the interface between the fresh water and the salt water of the groundwater, a water tank having the same concentration as the salt water is prepared and then gravity is adjusted. However, there is difficulty in adjusting the concentration in this method, and in addition, gravity adjustment is required per water tank, so that it is inconvenient.

As the related art of the present invention, an apparatus for tracking a position of a fresh water-salt water interface is proposed in Korean Patent Publication No. 10-0977155.

As shown in FIG. 1, the conventional apparatus includes a buoyancy deriver 10, a wireless measuring sensor 20, and a perforated pipe 30. The buoyancy deriver 10 is in the shape of a pipe having a space therein, and is closed at a bottom thereof, with a separable closing cap 14 mounted to a top thereof. Further, a bracket 12 having a through hole 12a is formed in a central portion of the bottom of the buoyancy deriver 10, and a metal 15 is provided in the closing cap 14 to be attached to a magnetic material. The buoyancy deriver 10 adjusts an amount of distilled water accommodated in the internal space to adjust buoyancy. The wireless measuring sensor 20 is mounted to the bottom of the buoyancy deriver 10. The perforated pipe 30 is mounted to the bottom of the buoyancy deriver 10 to surround the wireless measuring sensor 20.

Such a conventional apparatus is configured to be put into or discharged from an observation well while being secured to an electromagnet of a retractor (not shown) by the metal 15 provided in the cap 14, and is moved up and down in a longitudinal direction of the observation well according to a water level of the fresh water-salt water interface, thus indicating a position.

In this regard, as a groundwater inlet port is longitudinally formed through the observation well, it receives underground groundwater through the groundwater inlet port.

However, the conventional buoyancy deriver 10 is problematic in that an upper end or a lower end is caught by the inlet port of the observation well while the deriver moves up and down along the observation well, so that it may not provide exact information on position.

PATENT DOCUMENT (Patent Document 1) Korean Patent Publication No. 10-0977155

SUMMARY OF THE INVENTION

Accordingly, the present invention has been made keeping in mind the above problems occurring in the related art, and is intended to provide a monitoring probe for observing groundwater, which prevents a probe body moving up and down along an observation well from being caught by a structure such as a ground-water inlet port or an uneven portion formed along an inner circumference of an observation well, thus being capable of indicating an exact position of a fresh water-salt water interface.

In an aspect, the present invention provides a monitoring probe for observing groundwater put into an observation well of groundwater to provide a position of a fresh water-salt water interface of the groundwater, the monitoring probe including a probe body which is formed in a single body or to which an attachment is attached, the probe body having buoyancy corresponding to the fresh water-salt water interface and moving up and down along the fresh water-salt water interface, thus providing information on the position via the attachment or remotely detecting the information on the position; and a catch preventing portion separating both ends of the probe body from an inner circumference of the observation well, thus preventing both the ends of the probe body from being caught by an end of a ground-water inlet port or an uneven portion formed along the inner circumference of the observation well.

For example, the catch preventing portion may include a convex curved portion that protrudes in a shape of increasing an outer diameter of a midsection of the probe body while being integrated with the probe body, the convex curved portion facing the inner circumference of the observation well and separating both the ends of the probe body from the inner circumference of the observation well.

Further, the convex curved portion may protrude to be near an upper end or a lower end of the probe body.

Otherwise, the catch preventing portion may include a dumbbell-shaped portion provided to be adjacent to both the ends of the probe body, and protruding from both sides of the probe body, respectively, thus forming a shape of a dumbbell, the dumbbell-shaped portion facing the inner circumference of the observation well in a curved state and causing both the ends of the probe body to be separated from the inner circumference of the observation well.

Further, the dumbbell-shaped portion may be formed such that an outer diameter of a lower protruding portion of the probe body may be larger than that of an upper protruding portion thereof.

The monitoring probe may further include a buoyancy adjusting unit serving to adjust the buoyancy of the probe body to conform to the fresh water-salt water interface together with the attachment.

For example, the buoyancy adjusting unit may include a buoyant-material filling chamber formed in the probe body in a form of a hollow portion that is open at a side thereof, thus offering buoyancy via the hollow portion, the buoyant-material filling chamber being filled with a buoyancy control agent having a load to allow the buoyancy of the probe body to be adjusted; and a shielding cap water-tightly shielding an opening of the buoyant-material filling chamber.

Further, the shielding cap may be detachably equipped with a watertight member, the watertight member being fastened to the opening of the buoyant-material filling chamber in a threaded fastening manner to water-tightly seal a coupled portion, and the opening may be equipped with a watertight seat on which the watertight member is seated in such a way as to be in close contact therewith.

The watertight seat may be formed in a shape of an inclined surface such that an inner diameter thereof may be enlarged outwards from the buoyant-material filling chamber.

For example, the watertight member may be an O-ring fitted into a threaded portion of the shielding cap.

In addition, the buoyancy adjusting unit may further include a sealing member primarily shielding the opening of the buoyant-material filling chamber in such a way as to open or close the opening, and pressed by the shielding cap to seal the opening.

For example, the sealing member may include a sealing plate seated along an edge of the opening to shield the opening, and pressed by the shielding cap to come into close contact with the edge of the opening; and a coupler coupling the sealing plate with the probe body, and causing the sealing plate to come into close contact with the edge of the opening by an elastic force.

For example, the coupler may include a first hanger formed on a bottom surface of the sealing plate; a second hanger provided on the probe body to form a symmetry with the first hanger; and an elastic body hooked at both ends thereof onto the first and second hangers, thus causing the sealing plate to elastically come into close contact with the opening, the elastic body being elastically deformed as the sealing plate is separated from the opening to open the opening, thus returning the sealing plate to an original position thereof.

The monitoring probe may further include a detector attached to the probe body or provided to be distant from the probe body, thus offering the information on the position of the probe body.

For example, the detector may include a wireless measuring sensor detachably coupled to the probe body and moved up and down along with the probe body, thus wirelessly providing the information on the position of the fresh water-salt water interface.

Further, the wireless measuring sensor may be detachably equipped with a watertight member that may be fastened to a lower portion of the probe body in a threaded fastening manner to water-tightly seal a coupled portion, and the probe body may be equipped with a watertight seat on which the watertight member may be seated in such a way as to be in close contact therewith.

The monitoring probe may further include a traction portion allowing the probe body put into the observation well to be pulled by a retractor having an electromagnet, the traction portion including a metal body that is integrally provided in the probe body and is reacted by a magnetic force of the electromagnet of the retractor, thus attaching or detaching the probe body to or from the retractor.

Here, the probe body may be made of synthetic resin, and the metal body may be embedded, as an insert, in an outer surface of the probe body.

The monitoring probe may further include a display member provided on an outer circumference of the probe body to visually display the position of the probe body.

For example, the display member may include a fluorescent substance applied or attached to a surface of the upper end of the probe body.

As described above, the monitoring probe for observing the groundwater according to the present invention is advantageous in that both ends of the probe body are separated from the inner circumference of the observation well by the catch preventing portion having the convex curved portion or the dumbbell-shaped portion, so that the probe body can be smoothly moved up and down without being caught by the structure such as the ground-water inlet port or the uneven portion of the observation well, thus providing the exact position of the fresh water-salt water interface.

Further, the monitoring probe for observing the groundwater according to the present invention is advantageous in that the buoyant-material filling chamber of the buoyancy adjusting unit is primarily shielded by the sealing member and then is secondarily shielded by the shielding cap, so that the buoyant-material filling chamber can become firmly watertight, and in that the watertight seat on which the O-ring of the watertight member is seated is in the shape of the inclined surface, so that the shielding cap can water-tightly shield the buoyant-material filling chamber.

Furthermore, the monitoring probe for observing the groundwater according to the present invention is advantageous in that the wireless measuring sensor of the detector provides information on position while the sensor is moved up and down with it attached to the probe body, thus more precisely detecting the position of the fresh water-salt water interface.

Further, the monitoring probe for observing the groundwater according to the present invention is advantageous in that the metal body of the traction portion is fixedly embedded into the probe body by insert molding, thus preventing the metal body from being corroded or damaged, preventing the metal body from being separated from the probe body and thereby allowing the probe body to be always pulled by the retractor.

Furthermore, the monitoring probe for observing the groundwater according to the present invention is advantageous in that the display member is provided on the upper surface of the probe body, thus allowing a worker to check the position of the probe body by naked eye.

BRIEF DESCRIPTION OF DRAWINGS

FIG. 9 shows front views showing other embodiments of a dumbbell-shaped portion of FIG. 8 according to an embodiment of the invention;

DETAILED DESCRIPTION OF THE PRESENTLY PREFERRED EMBODIMENTS

Hereinbelow, preferred embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted.

Figure 1:
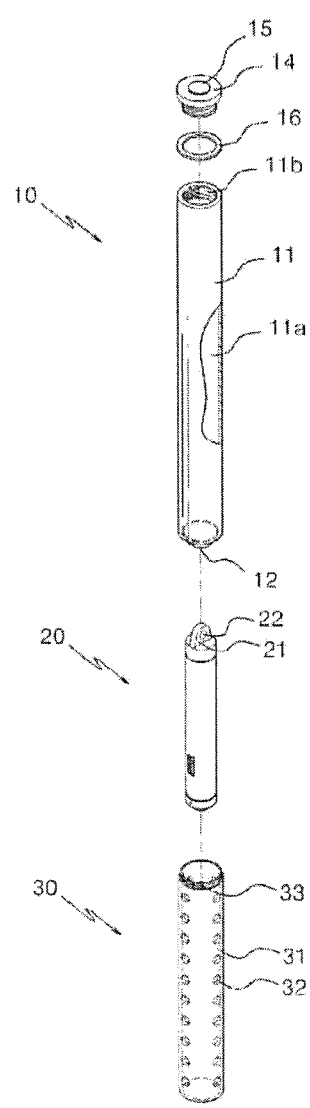
FIG. 1 is an exploded perspective view showing a conventional apparatus for tracking a position of a fresh water-salt water interface according to an embodiment of the invention.
Figure 2:
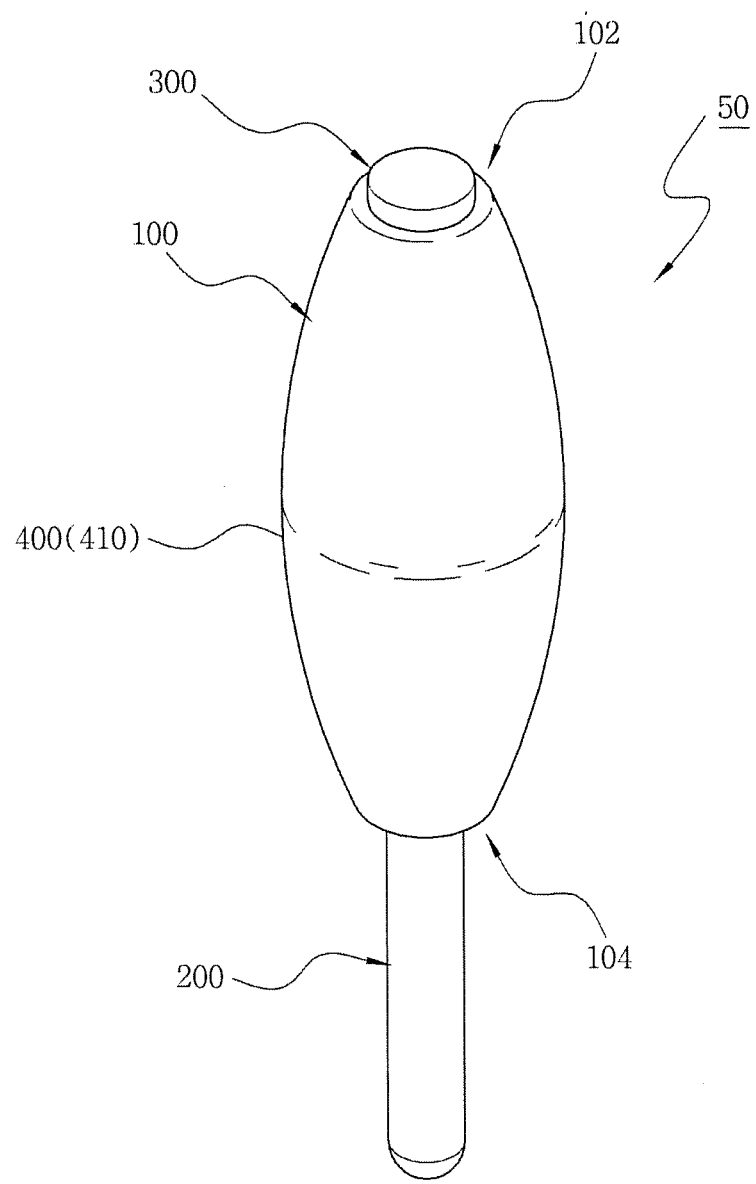
FIG. 2 is a perspective view showing a monitoring probe for observing groundwater according to an embodiment of the invention.
Figure 3:
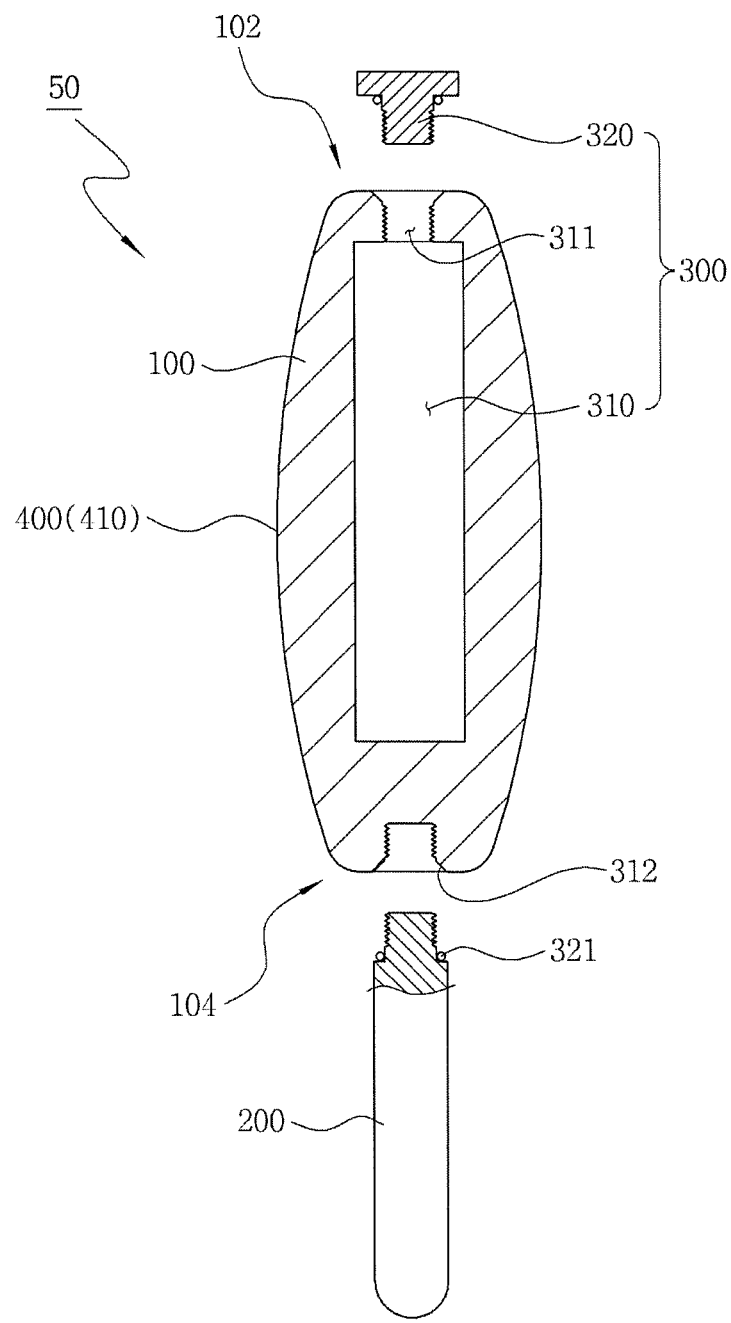
FIG. 3 is a longitudinal sectional view showing the monitoring probe for observing the groundwater according to an embodiment of the invention, in which the monitoring probe is in a separate state.

As shown in FIGS. 2 and 3, a monitoring probe 50 for observing groundwater according to the present invention may include a probe body 100 and a catch preventing portion 400.

The probe body 100 is a component that is put into an observation well 1 and is moved up and down along a fresh water-salt water interface while having buoyancy conforming to the fresh water-salt water interface.

Such a probe body 100 is preferably made of a material having salt resistance and has buoyancy conforming to the fresh water-salt water interface while forming a single body or has buoyancy conforming to the fresh water-salt water interface while a wireless measuring sensor 200 that will be described below is attached thereto.

Here, wireless measuring sensor 200 that will be described below is attached to the probe body 100, as shown in FIG. 2, the probe body 100 offers information on position by the wireless measuring sensor 200 while moving up and down along the fresh water-salt water interface.

Figure 11:
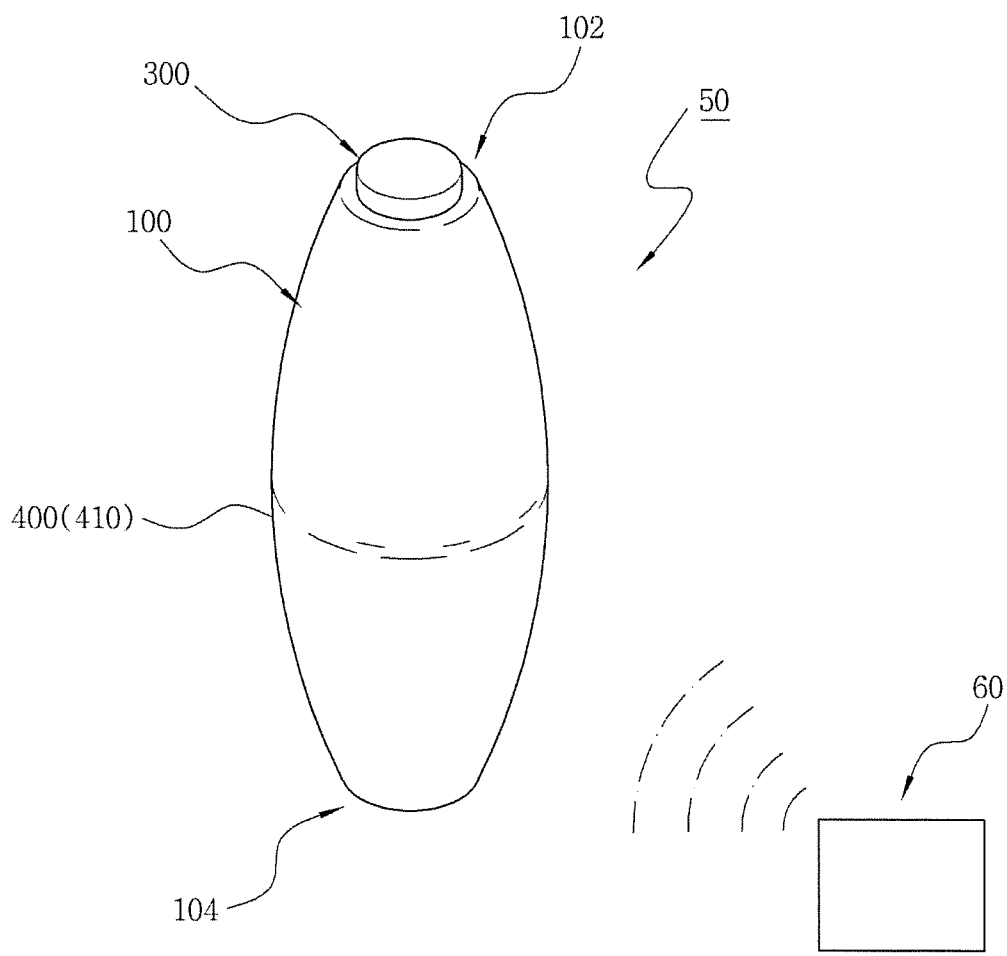
FIG. 11 is a perspective view showing a monitoring probe for observing groundwater according to the present invention.

Otherwise, when the probe body 100 comprises the single body without the wireless measuring sensor 200, the probe body 100 may remotely detect information on position by a remote detector 60 such as a laser rangefinder sensor or an underwater acoustic sensor while moving up and down along the fresh water-salt water interface as shown in FIG. 11.

Meanwhile, the probe body 100 may be adjusted to have buoyancy conforming to the fresh water-salt water interface by a buoyancy adjusting unit 300 that will be described below together with the wireless measuring sensor 200. Alternatively, the probe body may be set to buoyancy that is established during manufacture.

The catch preventing portion 400 is a component that prevents top and bottom ends 102, 104 of the probe body 100 from being caught by a structure such as an uneven portion or a ground-water inlet port formed along an inner circumference of the observation well 1 when the probe body 100 moves up and down.

For example, as shown in FIGS. 2 and 3, the catch preventing portion 400 may comprise a convex curved portion 410 that is formed by increasing an outer diameter of a midsection of the probe body 100.

As shown in the drawings, the convex curved portion 410 protrudes from an outer circumference of the midsection of the probe body 100, thus causing the top and bottom 102, 104 ends of the probe body 100 to be separated from the inner circumference of the observation well 1.

Figure 10:
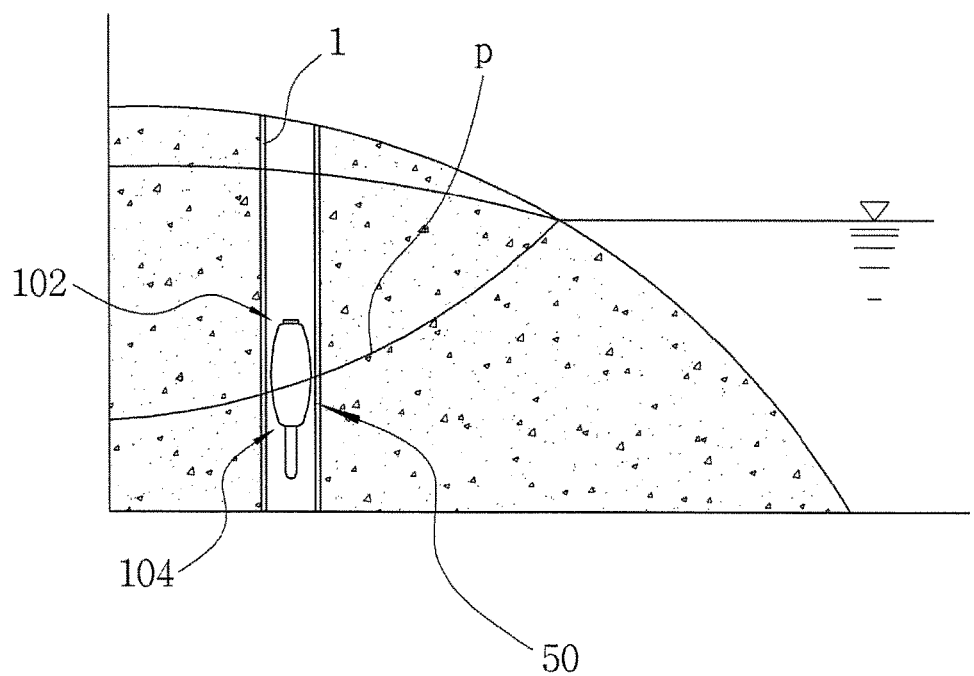
FIG. 10 is a schematic view showing the use according to an embodiment of the invention.

Thus, as shown in FIG. 10, the convex curved portion 410 faces the inner circumference of the observation well 1 in a curved state, thus preventing both the top and bottom ends 102, 104 of the probe body 100, a shielding cap 320 or the wireless measuring sensor 200 from being caught by the ground-water inlet port or the uneven portion of the observation well 1.

That is, as the probe body 100 first comes into contact with the inner circumference of the observation well 1 via the convex curved portion 410 having a curved cross-section, the probe body 100 can be smoothly moved up and down while preventing both the top and bottom ends of 102, 104 the probe body 100, the shielding cap 320 or the wireless measuring sensor 200 from being caught.

Figure 7:
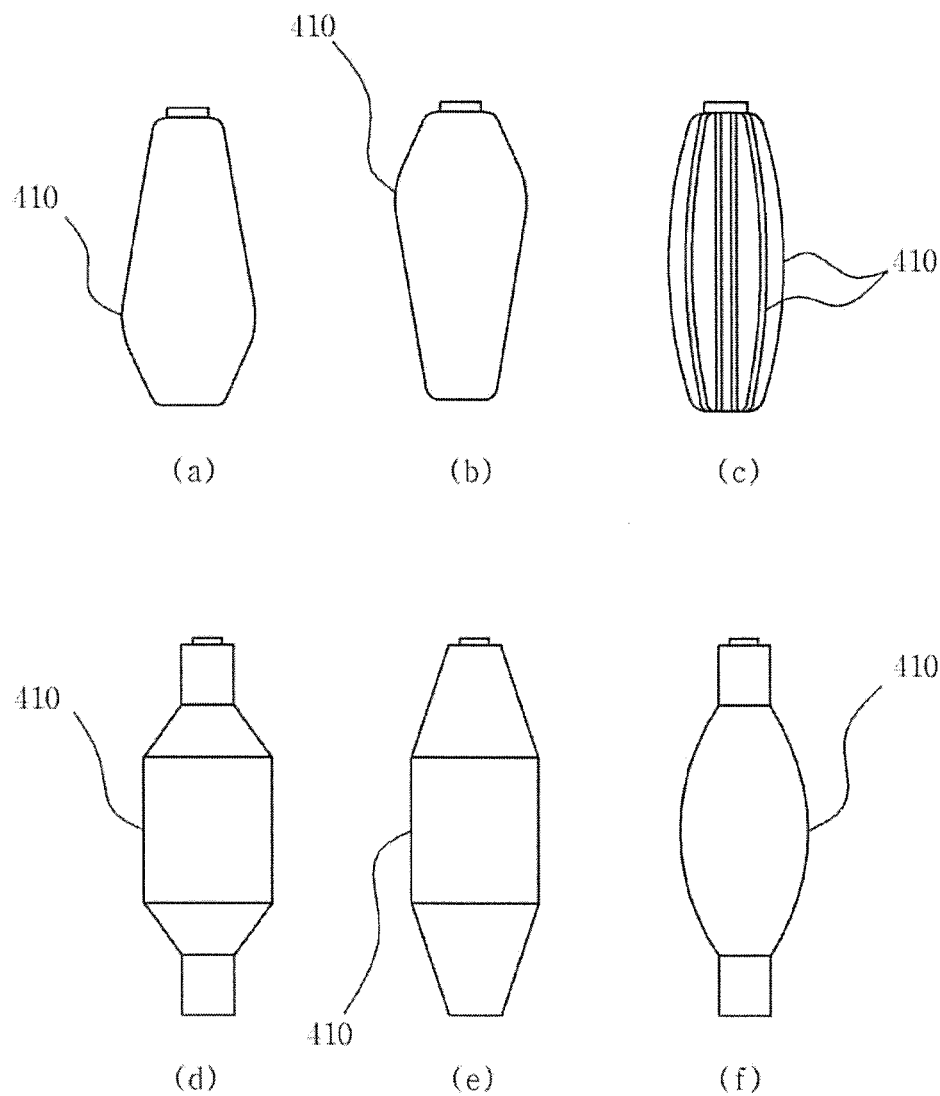
FIG. 7 shows front views showing a convex curved portion of FIG. 3 according to an embodiment of the invention.

Here, as shown in FIG. 7, the convex curved portion 410 may be modified in various forms.

For instance, the convex curved portion 410 may protrude near a lower end of the probe body 100 as shown in FIG. 7a, may protrude near an upper end of the probe body 100 as shown in FIG. 7b, or may protrude radially from the probe body 100 in the form of a convex curved wing as shown in FIG. 7c.

Further, the convex curved portion 410 may protrude in a cylindrical shape as shown in FIG. 7d, may protrude in a cylindrical shape while being obliquely connected to both the top and bottom ends of the probe body 100 as shown in FIG. 7e, or may protrude while being straightly connected to both the top and bottom ends of the probe body 100 as shown in FIG. 7f.

Figure 8:
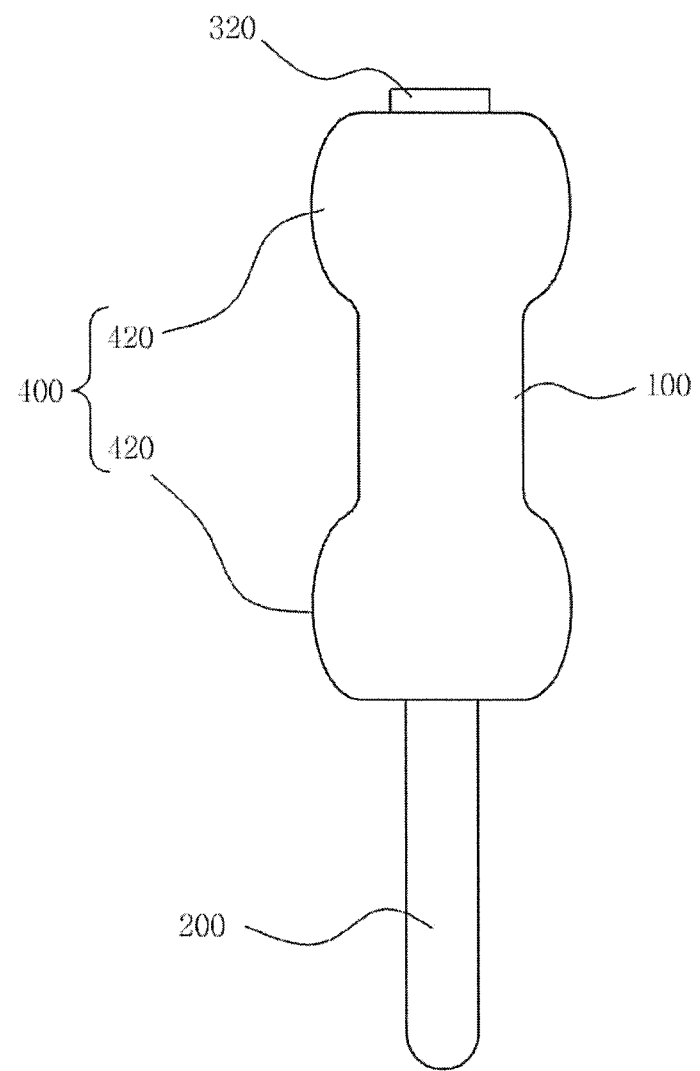
FIG. 8 is a front view showing another embodiment of a catch preventing portion according to an embodiment of the invention.

Meanwhile, the catch preventing portion 400 may include a dumbbell-shaped portion 420, as shown in FIG. 8.

As shown in the drawing, the dumbbell-shaped portion 420 is adjacent to both the top and bottom ends of the probe body 100, namely, the upper and lower ends, and protrudes in a curved shape at upper and lower regions thereof, respectively, thus approximately forming the shape of a dumbbell. As the dumbbell-shaped portion 420 faces the inner circumference of the observation well 1 in the curved state, the dumbbell-shaped portion 420 causes both the top and bottom ends of the probe body 100 to be separated from the inner circumference of the observation well 1.

Accordingly, as the probe body 100 first comes into contact with the inner circumference of the observation well 1 via the dumbbell-shaped portion 420 having a curved cross-section, the probe body 100 can be smoothly moved up and down while preventing both the top and bottom ends of the probe body 100, the shielding cap 320 or the wireless measuring sensor 200 from being caught.

In this regard, the dumbbell-shaped portion 420 may be formed, as shown in FIG. 9g, such that an outer diameter of a lower protruding portion of the probe body 100 is larger than that of an upper protruding portion thereof.

That is, as the dumbbell-shaped portion 420 protrudes from the lower portion of the probe body 100 in a larger outer diameter, the center of gravity may be provided to the lower portion of the probe body 100. Thus, the probe body 100 can be more stably moved up and down.

Otherwise, the dumbbell-shaped portion 420 may be formed, as shown in FIG. 9h, such that an outer diameter of an upper portion thereof is larger than that of a lower portion thereof.

Meanwhile, the catch preventing portion 400 may include a plurality of protrusions in a longitudinal direction of the probe body 100 as shown in FIG. 9i, or may include a single protrusion as shown in FIG. 9j.

The monitoring probe according to the present invention may further include the buoyancy adjusting unit 300, as shown in FIG. 3.

The buoyancy adjusting unit 300 serves to adjust the buoyancy of the probe body 100 to conform to the buoyancy of the fresh water-salt water interface with the wireless measuring sensor 200 attached to the buoyancy adjusting unit 300. For example, as shown in FIG. 3, the buoyancy adjusting unit 300 may include a buoyant-material filling chamber 310 and a shielding cap 320.

Figure 4:
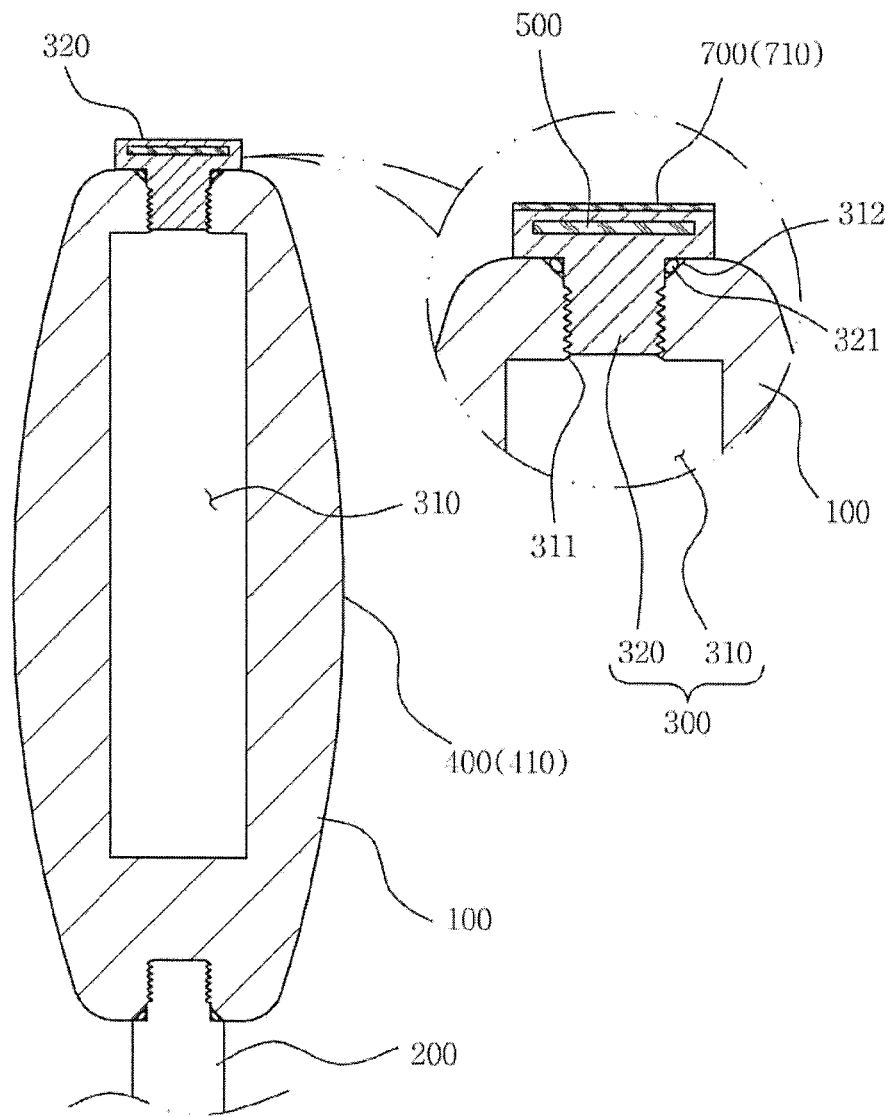
FIG. 4 is a longitudinal sectional view showing the monitoring probe of FIG. 3, in which it is in an assembled state according to an embodiment of the invention.

As shown in FIGS. 3 and 4, the buoyant-material filling chamber 310 is formed in the probe body 100 in the form of a hollow portion, thus offering buoyancy via the hollow portion. Since an opening 311 is formed at a side of the buoyant-material filling chamber 310, it is filled with a buoyancy control agent (not shown) through the opening 311 to adjust the buoyancy of the probe body 100 to conform to the buoyancy of the fresh water-salt water interface.

Such a buoyant-material filling chamber 310 may be formed in a shape corresponding to the catch preventing portion 400 as shown in FIG. 3, or may be formed in a cylindrical shape as shown in FIG. 4.

Here, the buoyancy control agent is not limited to a specific substance, but may be sand, distilled water or other weight substances, for example.

As shown in FIGS. 3 and 4, the shielding cap 320 water-tightly shields the opening 311 of the buoyant-material filling chamber 310.

As shown in FIG. 4, the shielding cap 320 is fastened to the probe body 100 in a threaded fastening manner, thus shielding the opening 311 of the buoyant-material filling chamber 310. Since the shielding cap 320 is fastened to the probe body 100 with a watertight member 321 provided on a threaded portion of the shielding cap 320, the opening 311 is water-tightly sealed.

Here, as shown in FIG. 4, a watertight seat 312 is provided in the opening 311 of the buoyant-material filling chamber 310 to allow the watertight member 321 to be seated on the watertight seat 312 while being in close contact therewith.

Figure 5:
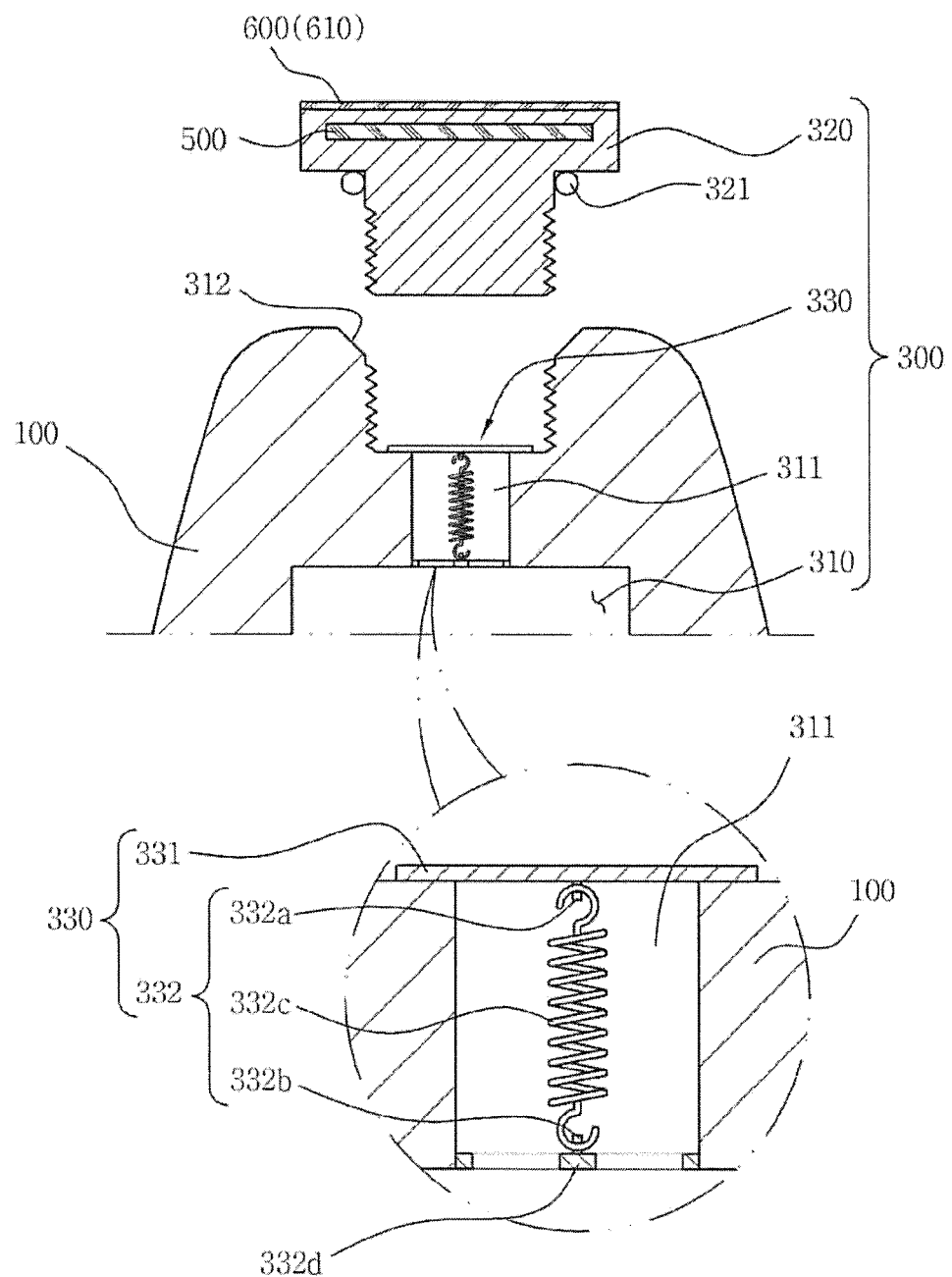
FIG. 5 is a longitudinal sectional view showing a buoyancy adjusting unit according to an embodiment of the invention.

Preferably, such a watertight seat 312 is formed in the shape of an inclined surface such that an inner diameter thereof is enlarged outwards from the probe body 100, as shown in FIG. 5.

That is, as the shielding cap 320 is tightened, the watertight member 321 comes into close contact with the watertight seat 312 in the shape of the inclined surface, thus sealing the opening 311.

For example, the watertight member 321 may comprise an O-ring fitted into the threaded portion of the shielding cap 320 as shown in the drawing. Further, the watertight member 321 may be in the form of a packing or a gasket.

Thus, the probe body 100 is adjusted to have buoyancy conforming to the fresh water-salt water interface while forming the single body, or is adjusted to have buoyancy conforming to the fresh water-salt water interface while the wireless measuring sensor 200 is attached thereto. The probe body 100 then moves up and down along the fresh water-salt water interface together with the wireless measuring sensor 200.

Meanwhile, the above-described buoyancy adjusting unit 300 may further include a sealing member 330 as shown in FIG. 5.

The sealing member 330 is pressed by the shielding cap 320 while primarily closing the opening 311 of the probe body 100 that is opened or closed by the shielding cap 320, thus sealing the opening 311.

For example, the sealing member 330 may include a sealing plate 331 and a coupler 332, as shown in FIG. 5.

The sealing plate 331 is seated along an edge of the opening 311 while being pressed by the coupler 332 that will be described below in detail, thus primarily shielding the opening 311, and is pressed by the shielding cap 320 that is fastened to the probe body 100 in the threaded fastening manner, thus coming into close contact with the edge of the opening 311.

Such a sealing plate 331 may be either a plate integrally having a sealing member such as a rubber ring, or a rubber plate.

The coupler 332 is a component that couples the sealing plate 331 to the probe body 100 and provides an elastic force, thus causing the sealing plate 331 to come into close contact with the edge of the probe body 100. For example, the coupler 332 may include a first hanger 332a, a second hanger 332b, and an elastic body 332c, as shown in FIG. 5.

The first hanger 332a is integrally provided on a bottom surface of the sealing plate 331, and the second hanger 332b is integrally provided on the probe body 100 to form a symmetry with the first hanger 332a.

Preferably, the second hanger 332b is formed on a structure 332d that is provided in the opening 311 of the probe body 100, as shown in FIG. 5.

The elastic body 332c serves to provide an elastic force to the sealing plate 331, and may comprise a tension coil spring, for example, as shown in FIG. 5. Both ends of the spring are hooked, respectively, onto the first and second hangers 332a and 332b with the spring being extended, thus causing the sealing plate 331 to come into close contact with the edge of the opening 311.

Further, when the sealing plate 331 is separated from the opening 311 to open it, the elastic body 332c is extended to elastically return the elastic force to its original position.

Meanwhile, the monitoring probe of the present invention may offer information on position by the wireless measuring sensor 200 that is attached to the probe body 100 or by the remote detector 60 that is distant from the probe body 100.

As shown in FIGS. 2 and 3, the wireless measuring sensor 200 is detachably attached to the probe body 100, for example.

The wireless measuring sensor 200 is a component that offers information on position of the fresh water-salt water interface while moving up and down together with the probe body 100 with the wireless measuring sensor 200 coupled to the lower portion of the probe body 100, as shown in FIGS. 2 and 3. The wireless measuring sensor 200 sends a signal indicative of a change in water level of the fresh water-salt water interface to a recording device installed at the ground by radio communications, thus allowing a person on the ground to check the information on position of the fresh water-salt water interface.

Such a wireless measuring sensor 200 may offer the information on position by measuring water pressure in the observation well 1, or may measure the temperature or electrical conductivity of the groundwater as well as the information on position of the fresh water-salt water interface and then deliver the measured value to the ground. Further, the wireless measuring sensor 200 may accommodate a record storing medium (not shown) therein to store the measured value.

Here, as shown in FIG. 3, the wireless measuring sensor 200 may be fastened to the probe body 100 in a threaded fastening method similarly to the above-described shielding cap 320, and may include a watertight member 321 and a watertight seat 312 to seal a coupled portion. Since the watertight member 321 and the watertight seat 312 are the same as the above-described watertight member and watertight seat, a detailed description thereof will be omitted herein.

Otherwise, as shown in FIG. 11, the remote detector 60 may comprise a laser rangefinder sensor or an underwater acoustic sensor, which is separated from the probe body 100 and radiates laser beams or ultrasonic waves onto the observation well 1 from the ground, thus remotely detecting the information on position of the probe body 100.

Since the laser rangefinder sensor or the underwater acoustic sensor are widely known to those skilled in the art, the detailed description thereof will be omitted herein.

Here, if the remote detector 60 is the laser rangefinder sensor or the underwater acoustic sensor, the above-described wireless measuring sensor 200 may be omitted, or the remote detector 60 may be provided together with the wireless measuring sensor 200.

The monitoring probe 50 for observing the groundwater according to the present invention may further include a traction portion.

The traction portion is a member that serves to secure the probe body 100 to an electromagnet of a retractor (not shown), and includes a metal body 500 that is reacted by a magnetic force of the electromagnet as shown in FIGS. 4 and 5.

In other words, when the probe body 100 is put into or discharged from the observation well 1 installed in the coastal area as shown in FIG. 10, the probe body 100 is secured via the metal body 500 to the electromagnet of the retractor.

The metal body 500 may be formed in the shape of a plate and then be integrally secured to the upper surface of the probe body 100 as shown in FIG. 4. Preferably, the metal body 500 may be fixedly embedded into an upper portion of the shielding cap 320 that is coupled to the upper surface of the probe body 100.

Preferably, the metal body 500 is embedded in the shielding cap 320 by insert molding when the shielding cap 320 is formed of synthetic resin, thus preventing the metal body 500 from being corroded by the groundwater or damaged by foreign matter.

Meanwhile, as shown in FIG. 5, the monitoring probe 50 for observing groundwater according to the present invention may further include a display member 600.

The display member 600 serves to visually display the position of the probe body 100.

For example, the display member 600 may contain a fluorescent substance 610 that is attached to or applied to the upper surface of the probe body 100. The display member 600 may be preferably provided on the upper surface of the shielding cap 320 that is coupled to the upper surface of the probe body 100.

The fluorescent substance 610 may comprise a fluorescent paint to be applied to the upper surface of the shielding cap 320, or may comprise a fluorescent sheet to be attached to the upper surface of the shielding cap 320.

Figure 6:
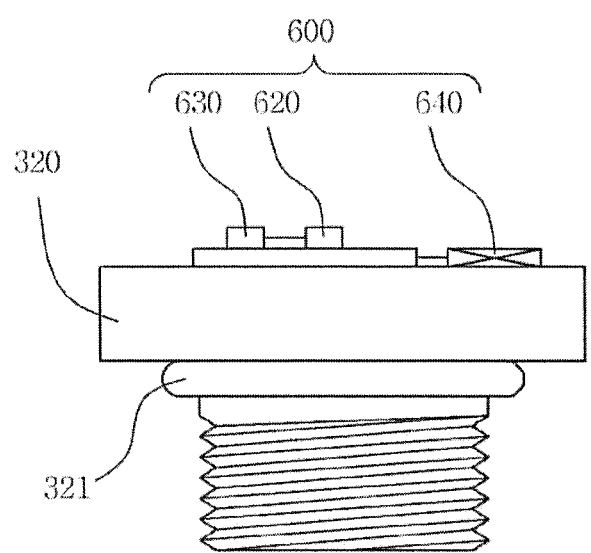
FIG. 6 is a view showing a configuration of a display member according to an embodiment of the invention.

Otherwise, as shown in FIG. 6, the display member 600 may include a LED lamp 620, a battery 630 and a controller 640.

The LED lamp 620 is provided on the upper surface of the shielding cap 320 to emit light using power from the battery 630 and thereby display the position of the probe body 100.

The controller 640 controls the supply of power from the battery 630 under radio control, thus controlling the light emitting of the LED lamp 620.

The use and operation of the monitoring probe 50 according to the present invention including the above-mentioned components will be described below.

First, a user puts the buoyancy control agent into the buoyant-material filling chamber 310 of the probe body 100 in the state where the wireless measuring sensor 200 is coupled to the lower portion of the probe body 100, and adjusts the buoyancy of the probe 50 to conform to the fresh water-salt water interface p.

Subsequently, the user secures the probe body 100 to the electromagnet of the retractor (not shown) using the shielding cap 320 in which the metal body 500 is embedded, and puts the probe 50 into the observation well 1 in the ground of the coastal area as shown in FIG. 10, and then separates the probe 50 from the retractor by eliminating the magnetic force of the electromagnet.

Thus, while the probe 50 is moved up and down along the fresh water-salt water interface p by a change in water level of the groundwater, the probe 50 delivers information on a current position through the wireless measuring sensor 200 to the ground.

Here, since the probe 50 moves up and down while facing the inner circumference of the observation well 1 via the convex curved portion 410 or the dumbbell-shaped portion 420 protruding from the probe body 100, the probe 50 can be smoothly moved up and down while preventing both the top and bottom ends of the probe body 100, the shielding cap 320 or the wireless measuring sensor 200 from being caught. As a result, it is possible to provide exact information on position.

As described above, the monitoring probe 50 for observing the groundwater according to the present invention is configured such that both the top and bottom ends of the probe body 100 are separated from the inner circumference of the observation well 1 by the catch preventing portion 400 comprising either the convex curved portion 410 or the dumbbell-shaped portion 420, thus allowing the probe body 100 to be smoothly moved up and down without being caught by the ground-water inlet port of the observation well 1 and thereby providing exact information on the position of the fresh water-salt water interface.

Further, according to the present invention, after the buoyant-material filling chamber 310 constituting the buoyancy adjusting unit 300 is primarily shielded by the sealing member 330, it is secondarily shielded by the shielding cap 320, so that the buoyant-material filling chamber 310 can be firmly kept water-tight. Since the watertight seat 312 on which the O-ring constituting the watertight member 321 is seated is in the form of the inclined surface, the shielding cap 320 can water-tightly shield the buoyant-material filling chamber 310.

Furthermore, according to the present invention, the wireless measuring sensor 200 provides the information on position while moving up and down with it being attached to the probe body 100, thus allowing the position of the fresh water-salt water interface to be more precisely detected.

Moreover, according to the present invention, the metal body 500 constituting the traction portion is fixedly embedded, by insert molding, in the shielding cap 320 that is coupled to the upper surface of the probe body 100, thus preventing the corrosion or damage to the metal body 500, and the metal body 500 is not separated from the probe body 100, so that it is possible to always pull the probe body 100 to the retractor.

Further, the fluorescent substance 610 or the LED lamp 620 is provided on the upper surface of the probe body 100, thus allowing the position of the probe body 100 to be seen by naked eye.

Although the embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides a monitoring probe for observing groundwater, in which a probe body can be smoothly moved up and down without being caught by a structure such as a ground-water inlet port or an uneven portion of an observation well, thus providing an exact position of a fresh water-salt water interface and thereby being applicable to the field of groundwater exploration or water investigation in a coastal area.

The invention claimed is:

1. A monitoring probe for observing groundwater in an observation well to provide a position of a fresh water-salt water interface of the groundwater, the monitoring probe comprising:
a probe body, the probe body having buoyancy corresponding to the fresh water-salt water interface and floating at the fresh water-salt water interface;
a wireless measuring sensor attached to the probe body to measure a position of the monitoring probe in the observation well;
a catch preventing portion separating top and bottom ends of the probe body from an inner circumference of the observation well, thus preventing the top and bottom ends of the probe body from being caught by an end of a ground-water inlet port or an uneven portion formed along the inner circumference of the observation well; and
a buoyancy adjusting unit enabling adjustment of the buoyancy of the probe body,
wherein,
the buoyancy adjusting unit comprises (a) a buoyant-material filling chamber formed in the probe body in a form of a hollow portion that has an opening at an end thereof, thus offering buoyancy via the hollow portion, the buoyant-material filling chamber being filled with a buoyancy control agent having a load to allow the buoyancy of the probe body to be adjusted, (b) a shielding cap water-tightly shielding the opening of the buoyant-material filling chamber, and (c) a sealing member primarily shielding the opening of the buoyant-material filling chamber in such a way as to open or close the opening, and pressed by the shielding cap to seal the opening, and
the sealing member comprises (a) a sealing plate seated along an edge of the opening to shield the opening, and pressed by the shielding cap to come into close contact with the edge of the opening, and (b) a coupler coupling the sealing plate with the probe body, and causing the sealing plate to come into close contact with the edge of the opening by an elastic force.

2. The monitoring probe according to claim 1, wherein the catch preventing portion comprises a convex curved portion that protrudes in a shape of increasing an outer diameter of a midsection of the probe body while being integrated with the probe body, the convex curved portion facing the inner circumference of the observation well and separating the top and bottom ends of the probe body from the inner circumference of the observation well.

3. The monitoring probe according to claim 2, wherein the convex curved portion protrudes to be near an upper end or a lower end of the probe body.

4. The monitoring probe according to claim 1, wherein the catch preventing portion comprises a dumbbell-shaped portion provided to be adjacent to the top and bottom ends of the probe body, and protruding from both sides of the probe body, respectively, thus forming a shape of a dumbbell, the dumbbell-shaped portion facing the inner circumference of the observation well in a curved state and causing the top and bottom ends of the probe body to be separated from the inner circumference of the observation well.

5. The monitoring probe according to claim 4, wherein the dumbbell-shaped portion is formed such that an outer diameter of a lower protruding portion of the probe body is larger than that of an upper protruding portion thereof.

6. The monitoring probe according to claim 1, wherein the shielding cap is detachably equipped with a watertight member, the watertight member being fastened to the opening of the buoyant-material filling chamber in a threaded fastening manner to water-tightly seal a coupled portion, and
the opening is equipped with a watertight seat on which the watertight member is seated in such a way as to be in close contact therewith.

7. The monitoring probe according to claim 6, wherein the watertight seat is formed in a shape of an inclined surface such that an inner diameter thereof is enlarged outwards from the buoyant-material filling chamber.

8. The monitoring probe according to claim 6, wherein the watertight member comprises an O-ring fitted into a threaded portion of the shielding cap.

9. The monitoring probe according to claim 1, wherein the coupler comprises:

a first hanger formed on a bottom surface of the sealing plate;

a second hanger provided on the probe body to form a symmetry with the first hanger; and an elastic body hooked at both ends thereof onto the first and second hangers, thus causing the sealing plate to elastically come into close contact with the opening, the elastic body being elastically deformed as the sealing plate is separated from the opening to open the opening, thus returning the sealing plate to an original position thereof.

10. The monitoring probe according to claim 1, further comprising a remote detector provided distant from the probe body, thus offering the information on the position of the probe body.

11. The monitoring probe according to claim 1, wherein the wireless measuring sensor is equipped with a watertight member that is detachably fastened to a lower portion of the probe body in a threaded fastening manner to water-tightly seal a coupled portion, and the probe body is equipped with a watertight seat on which the watertight member is seated in such a way as to be in close contact therewith.

12. The monitoring probe according to claim 1, further comprising:

a traction portion allowing the probe body put into the observation well to be pulled by a retractor having an electromagnet, the traction portion comprising a metal body that is integrally provided in the probe body and is reacted by a magnetic force of the electromagnet of the retractor, thus attaching or detaching the probe body to or from the retractor.

13. The monitoring probe according to claim 12, wherein the probe body is made of synthetic resin, and the metal body is embedded, as an insert, in an outer surface of the probe body.

14. The monitoring probe according to claim 1, further comprising a display member provided on an outer circumference of the probe body to visually display the position of the probe body.

15. The monitoring probe according to claim 14, wherein the display member comprises a fluorescent substance applied or attached to a surface of the upper end of the probe body.

16. A monitoring probe for observing groundwater in an observation well to provide a position of a fresh water-salt water interface of the groundwater, the monitoring probe comprising:

a probe body having buoyancy corresponding to the fresh water-salt water interface and floating at the fresh water-salt water interface, a catch preventing portion separating top and bottom ends of the probe body from an inner circumference of the observation well, thus preventing the top and bottom ends of the probe body from being caught by an end of a ground-water inlet port or an uneven portion formed along the inner circumference of the observation well; and a buoyancy adjusting unit enabling adjustment of the buoyancy of the probe body, wherein, the buoyancy adjusting unit comprises (a) a buoyant-material filling chamber formed in the probe body in a form of a hollow portion that is open at a side thereof, thus offering buoyancy via the hollow portion, the buoyant-material filling chamber being filled with a buoyancy control agent having a load to allow the buoyancy of the probe body to be adjusted, (b) a shielding cap water-tightly shielding an opening of the buoyant-material filling chamber, and (c) a sealing member primarily shielding the opening of the buoyant-material filling chamber in such a way as to open or close the opening, and pressed by the shielding cap to seal the opening, and the sealing member comprises (a) a sealing plate seated along an edge of the opening to shield the opening, and pressed by the shielding cap to come into close contact with the edge of the opening, and (b) a coupler coupling the sealing plate with the probe body, and causing the sealing plate to come into close contact with the edge of the opening by an elastic force.

* * * * *